United States Patent
Chaudhri et al.

(10) Patent No.: US 8,401,030 B2
(45) Date of Patent: Mar. 19, 2013

(54) ALLOCATION OF CHANNELS IN A DEDICATED FREQUENCY SPECTRUM ON A SECONDARY BASIS

(75) Inventors: Apoorv Chaudhri, Cambridge, MA (US); David P. Gurney, Carpentersville, IL (US); Roberto A. Perez, Miramar, FL (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1135 days.

(21) Appl. No.: 12/330,037

(22) Filed: Dec. 8, 2008

(65) Prior Publication Data

US 2010/0144357 A1 Jun. 10, 2010

(51) Int. Cl.
*H04W 72/04* (2009.01)
*H04M 1/00* (2006.01)

(52) U.S. Cl. ......................... 370/406; 370/468
(58) Field of Classification Search .................. 370/468, 370/338, 329; 455/518, 450
See application file for complete search history.

(56) References Cited

U.S. PATENT DOCUMENTS

| | | | | |
|---|---|---|---|---|
| 5,666,661 A * | 9/1997 | Grube et al. | ................ | 455/509 |
| 5,781,860 A * | 7/1998 | Lopponen et al. | ......... | 455/426.1 |
| 5,907,794 A | 5/1999 | Lehmusto et al. | | |
| 5,960,360 A * | 9/1999 | Carmon et al. | ................ | 455/518 |
| 6,275,500 B1 | 8/2001 | Callaway, Jr. et al. | | |
| 6,580,704 B1 | 6/2003 | Wellig et al. | | |
| 6,925,286 B1 * | 8/2005 | Kraiem et al. | ................ | 455/13.4 |
| 7,117,002 B2 | 10/2006 | Kanazawa et al. | | |
| 7,486,963 B2 * | 2/2009 | Edman | ........................ | 455/550.1 |
| 2006/0148502 A1 * | 7/2006 | Korneluk et al. | ............. | 455/518 |
| 2006/0160544 A1 * | 7/2006 | Sun et al. | .................... | 455/456.1 |

OTHER PUBLICATIONS

Callaway, Jr. E.H., "Wireless Sensor Networks," Architecture and Protocols, Auerbach Publications, p. 28, 2004.

* cited by examiner

*Primary Examiner* — Ian N Moore
*Assistant Examiner* — Thai Nguyen
(74) *Attorney, Agent, or Firm* — Barbara R. Doutre (57) ABSTRACT

Allocation of channels in a dedicated frequency spectrum on a secondary basis. A direct mode communication request (150) from a first wireless communication device (112) can be received and processed to determine whether there are one or more secondary communication channels over which direct mode communication may be implemented between the first wireless communication devices and other wireless communication devices (114, 116, 118) without violating at least one communication policy for the secondary communication channel. Use of a secondary communication channel can be assigned or denied. In addition, a direct mode communication request can be communicated from a wireless communication device to a base transceiver station (104) identifying one or more other communication devices for which direct mode communication is requested.

3 Claims, 4 Drawing Sheets

ALLOCATION OF CHANNELS IN A DEDICATED FREQUENCY SPECTRUM ON A SECONDARY BASIS

BACKGROUND OF THE INVENTION

1. Field of the Invention

The present invention generally relates to wireless communications and, more particularly, to improving the efficiency of frequency spectrum utilization.

2. Background of the Invention

With the continued proliferation of wireless communications and the increasing demand for wireless broadband access, the availability of various frequency spectrums over which to communicate has become scarce. With this in mind, the National Telecommunications and Information Administration (NTIA) and the Federal Communications Commission (FCC) have been investigating opening up certain frequency bands to expand commercial use in these frequency spectrums. Moreover, both the NTIA and FCC also are inquiring into new technologies that may be implemented to increase the efficiency of frequency spectrum utilization.

One relatively new technology for increasing the utilization of various frequency spectrums is cognitive radio. Cognitive radio is a paradigm for wireless communication in which either a network or a wireless network node changes its transmission or reception parameters to communicate efficiently while avoiding interference with other licensed and/or unlicensed users. This alteration of parameters is based on the active monitoring of several factors in the external and internal radio environment, such as radio frequency spectrum, user behavior and network state.

With the advantages of cognitive radio in mind, the NTIA is considering provisions to allow the use of cognitive radio opportunistically on a secondary access basis for the 410 MHz to 420 MHz frequency spectrum. Similarly, the FCC is considering provisions to allow the use of cognitive radio opportunistically on a secondary access basis for the 470 MHz to 698 MHz frequency spectrum. When using a frequency spectrum opportunistically on a secondary access basis, the designated frequency spectrum must only be used when there is an opportunity to use the frequency spectrum without interfering with communications of incumbent users, especially primary or licensed users. Thus, the use of cognitive radio is implemented to monitor the frequency spectrum to identify available channels, and only allow radio transmissions on the identified channels when the risk of such transmissions interfering with incumbent users is sufficiently mitigated.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the allocation of channels in a dedicated frequency spectrum on a secondary basis for use in direct mode communication. In particular, such channels can be allocated for use by wireless communication devices, for example mobile radios, that are configured for direct mode communication. Using direct mode communication, a greater amount bandwidth can be utilized by the wireless communication devices due to reductions in communication overhead and reductions in time/frequency contention for use of the allocated channels. As used herein, the term "direct mode communication" means communication in which communication signals are propagated directly from one wireless communication device to at least one other wireless communication device without requiring the use of communication network infrastructure to propagate the communication signals.

Figure 1:
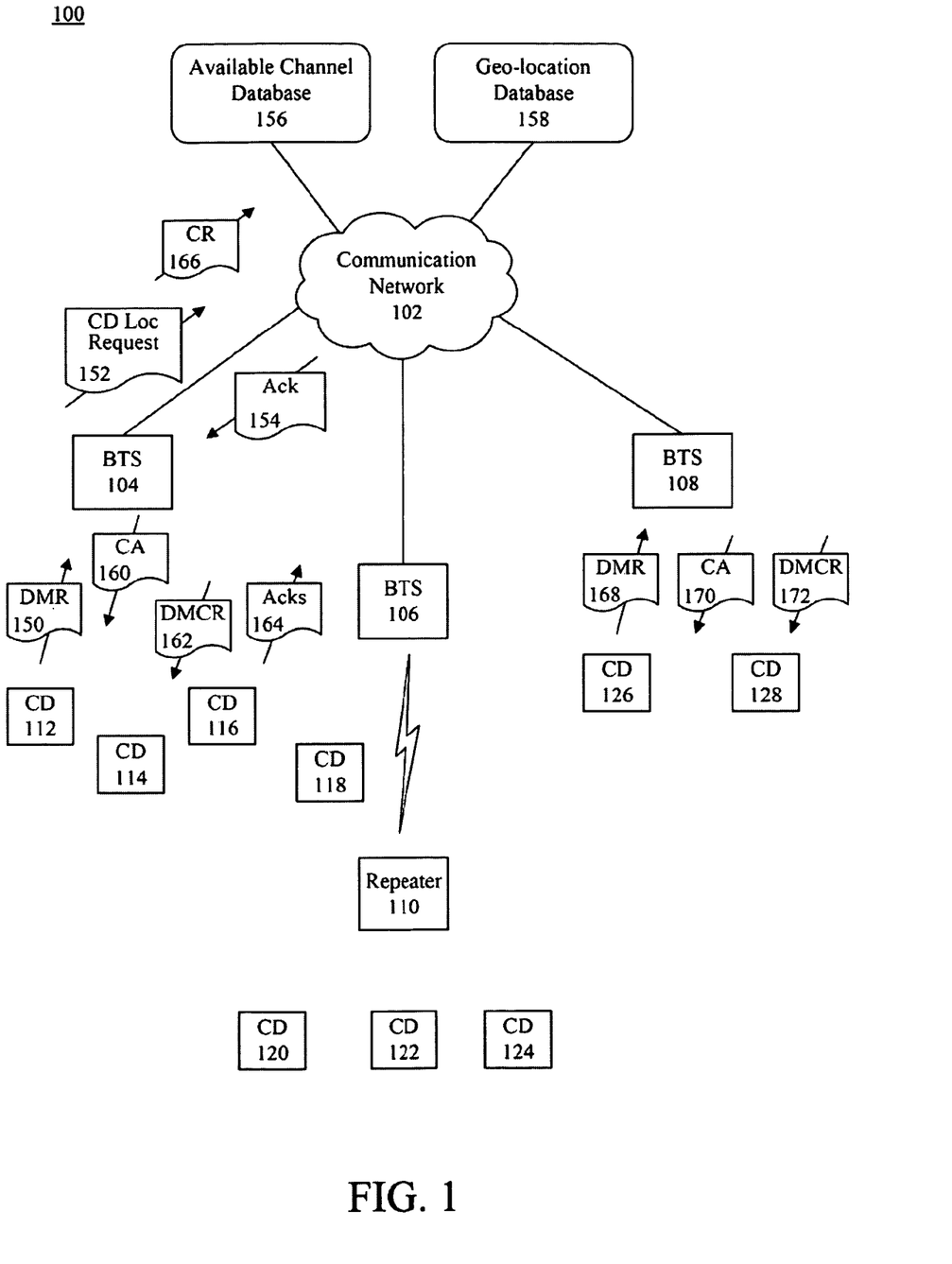
FIG. 1 depicts a communication system that is useful for understanding the present invention.

FIG. 1 depicts a communication system 100 that is useful for understanding the present invention. The communication system 100 can include a communication network 102. The communication network 102 can include fixed network equipment that support communication to and from the wireless communication devices. Examples of the fixed network equipment can include, but are not limited to, network servers, gateways, switches, routers, home location registers, and/or any other devices that support wireless communications. The use of fixed network equipment is well known to those skilled in the art of wireless communications.

One or more base transceiver stations, for example a base transceiver station (BTS) 104, a BTS 106 and a BTS 108, can be communicatively linked to the communication network 102 via suitable network architecture. Further, one or more of the BTSs 104-106 can be configured to implement cognitive radio functions, as will be described.

One or more repeaters also can be provided in the communication system 100 to supplement base transceiver station communications. For example, a repeater 110 can be provided to extend the communication range of the BTS 104. The repeater 110 can be fixed at a particular location, or can be mobile. For example, the repeater 110 can be a mobile repeater, such as the type oftentimes used in public safety communication systems. In the arrangements described herein, the fixed network equipment, the BTSs 104-108 and the repeater 110 may collectively be referred to as communication network infrastructure.

The communication system 100 also can include a plurality of wireless communication devices 112, 114, 116, 118, 120, 122, 124, 126, 128. The wireless communication devices (hereinafter "communication devices") 112-128 can be any communication devices that are suitably configured to communicate via direct mode communication. As such, the communication devices can be mobile radios, mobile telephones, personal digital assistants, computers, mobile computers, application specific communication devices, and the like. Further, the communication devices 112-128 can be subscribers to communication services provided by the communication system 100.

In operation, a communication device 112 that desires to establish direct mode communication with other communication devices 114-118 can communicate a direct mode communication request 150 to its presently serving BTS 104 requesting permission to establish a direct mode communication session among the communication device 114-118. The direct mode communication request 150 can be sent in response to a user input or in response to the communication device 112 detecting parameters that indicate that direct mode communication is desirable. Such parameters can include, for example, measured data that indicates that the quality of communications via the BTS 104 has fallen below a threshold value. Examples of such data can include, but are not limited to, channel quality, channel delay/jitter, available bandwidth, and the like.

Other parameters that indicate that direct mode communications are desired may include parameters that indicate a need for additional communications bandwidth among communication devices 112-128. Additional communications bandwidth can be useful for certain applications, such as real-time video communications or for sending large data sets or files among communications devices. The direct mode communication request 150 can be initiated automatically by the communications device 112, or may be initiated by a user. In addition, direct mode communication can be initiated by the BTS 104, for example to implement load balancing, improve the efficiency of frequency utilization or spectrum reuse, to extend the range of a low power communication device, and so on.

The direct mode communication request 150 can include identifiers associated with the other communication devices 114-118 with which the communication device 112 wants to establish direct mode communications. The identifiers can be associated with a particular call group, or selected by a user when generating the direct mode communication request 150. Call groups may defined in any suitable manner, and thus may include or exclude any of communications devices 112-128.

In response to receiving the direct mode communication request 150, the BTS 104 can determine whether the identified communication devices 114-118 are currently within the geographic region covered by the BTS 104. For instance, the BTS 104 can verify whether each of the identified communication devices 114-118 have established network presence via the BTS 104 or is registered with the BTS 104.

In some instances, one or more of the identified communication devices 114-118 currently may not be within the geographic region covered by the BTS 104 or may not have established network presence via the BTS 104. In such instances, the BTS 104 can communicate with fixed network equipment of the communication system 100 to identify whether the communication devices 114-118 are present within the communication system 100 (either actively or in idle mode) and, if so, where the communication devices are present.

For example, if the communication device 118 has not established network presence with the BTS 104, the BTS 104 can communicate a communication device location request 152 to the communication network 102 (e.g. to a location register or a geo-location/policy database 158), to determine whether the communication device 118 is present in the communication system 100. In response, the communication network 102 can provide an acknowledgement 154 indicating whether the communication device 118 is present in the communication system 100, either actively or in idle mode. The acknowledgement 154 also can indicate the BTS 104-108 presently serving the communication device 118, for example the BTS 106.

A BTS 104-108 which may serve the communication device 118 also can be determined by the physical location of the communication device 118. For example, if the communication device 118 comprises, or is otherwise linked to, a global positioning satellite (GPS) system, the GPS coordinates of the communication device 118 can be processed to identify the present location of the communication device 118. Alternatively, a local positioning system can be used to identify the present location of the communication device 118. For instance, trilateration can be implemented to process signals (e.g. range requests) transmitted by the communication device 118. Such signals can be received by one or more of BTSs 104-106, repeater(s) 110, and/or any other components of the communication system 100 configured to receive such signals.

Regardless of how the present location of the communication device 118 is determined, if the communication device 118 is present in the communication system 100, a BTS 106 serving the region in which the communication device 118 is located can be determined, and such BTS 106 can be identified to the BTS 104 in the acknowledgment 154.

Referring again to the direct mode communication request 150, the BTS 104 or communication network 102 can determine the communication capabilities of the wireless communication devices 114-118 for which direct mode communication is requested. For instance, the BTS 104 can determine the maximum transmit power of the communication devices 112-118 which are requested to participate in the direct mode communication session. The BTS 104 also can determine the channel parameters supported by the communication devices 112-118, whether the communication devices 112-118 support direct mode communication, and/or any other characteristics such as channel bandwidth, band, modulation type, etc. that may be pertinent to determine whether they may participate in the requested direct mode communication session. Hereinafter, the maximum transmit power, supported channel parameters and other characteristics may be collectively referred to as "communication capabilities."

For the purpose of clarity, processes that may be performed by the BTS 104 and/or the communication network 102 will be described hereinafter as being performed by the BTS 104. Nonetheless, it will be understood to those skilled in the art that, unless otherwise indicated, the processes described may be performed exclusively by the BTS 104, exclusively by one or more devices of the communication network 102, or distributed among the BTS 104 and one or more devices of the communication network 102. Accordingly, the present invention is not limited to these specific examples and arrangements.

In one example, the communication capabilities of each communication device 112-118 can be determined based on known characteristics of the respective communication devices 112-118. In another arrangement, requests can be communicated to the communication devices 112-118 inquiring their communication capabilities, and the BTS 104 can process responses to such requests.

Based on the communication capabilities of the communication devices 112-118 for which direct mode communication is requested, the BTS 104 can determine characteristics (e.g. maximum transmit power, modulation schemes, etc.) of one or more channels that would be necessary to support the requested direct mode communication, and determine if any secondary communication channels are available over which the direct mode communication between the communication device 112 and the communication devices 116-118 can be implemented without violating communication policies established for such secondary communication channels. For example, the BTS 104 can determine whether there is at least one secondary communication channel available over which direct mode communication among the communication devices 112-118 may be implemented without violating a policy that defines maximum transmit power, acceptable modulation schemes, and/or the like.

As used herein, the term "sensing results" means hard and/or soft information received from the communication devices 112-128. Hard information can be a binary decision specifying whether activity is detected or not detected on the secondary communication channel. Soft information can include signal-to-noise ratio (SNR) values, received signal strength indicator (RSSI), correlation data, information as whether the channel is being used, and if the channel is being used, the user of the channel, the sensing algorithm that is being used by a node, sensing algorithm parameters adopted by the node, extracted signal features, key markers within the data, extracted data that can be used to identify the user, operating channel characteristics, the like, or a combination thereof.

As used herein, the term "secondary communication channel" means a communication channel that may be established by a non-incumbent user in a frequency spectrum that is allocated to at least one incumbent user so long as use of the communication channel by the non-incumbent user does not interfere with communications of the incumbent user(s). An incumbent user is a user or other entity that is licensed to use the frequency spectrum, or a user (or other entity) that is otherwise granted rights as a primary user of the frequency spectrum.

The BTS 104 also can access an available channel database 156 that identifies available secondary communication channels that may be used for direct mode communication, as well as any communication policies applicable to the secondary communication channels. The identified secondary communication channels can be those that are presently unused, or secondary communication channels that are used, but which can tolerate interference that may be generated by the communication devices 112-118, or a subset of the communication devices 112-118, when the communication devices 112-118 transmit in accordance with the specified communication policies. If no secondary communication channels are identified as being available for use by the communication devices 112-118 for direct mode communication, the BTS 104 can communicate an acknowledgement to the communication device 112 indicating such.

These communication policies provided by the available channel database 156 also may define a maximum transmit power available on various secondary communication channels, as well as communication frequencies, modulation schemes, communication protocols, and/or any other parameters required of the communication devices 112-118 when using the respective secondary communication channels to communicate among one another. If one or more of the communication devices 112-118 would not be able to participate in the direct mode communication session while complying with the specified communication policies provided by the available channel database 156, then the BTS 104 can identify such communication devices 112-118 as being unavailable to participate in the requested direct mode communication session.

The BTS 104 also can access data from the geo-location database 158 which identifies communication policies applicable to the various communication devices 112-118 based on their respective geographic locations. Based on data retrieved from the geo-location database 158, the BTS 104 can determine whether there are policies applicable to the communication devices 112-118 based on their geographic location that would preclude the communication devices 112-118 from participating in the requested direct mode communication. For example, the BTS 104 can determine a communication policy for a secondary channel based on the location of one or more of the wireless communication devices 112-118.

In this regard, the geo-location database 158 can specify communication policies for various geographic locations. For instance, the geo-location database 158 can indicate maximum power levels that may be used for transmission over one or more secondary communication channels. If the indicated maximum power levels are lower than that required for direct mode communication, then the secondary communication channels may be unsuitable to establish direct mode communication among the communication devices 112-118. More specifically, an example of an unsuitable channel is one in which the maximum allowable transmit power level is less than the transmit power that is required to reach another communications device involved in the direct mode communications. This may be computed based on known communications device locations, and measured or predicted propagation data. In general, the BTS 104 can identify channels that are available for which a suitable transmit power level is available for all of the communications devices 112-118 that are to participate in the requested direct mode communication, when possible.

The geo-location database 158 also can indicate transmit mask requirements for one or more of the secondary communication channels. If the transmit mask requirements can not be met by each of the communication devices 112-118, these channels can be determined to be unsuitable for direct mode communication among the group of communication devices 112-118.

If there are communication policies identified by the geo-location database 158 that preclude the communication devices 112-118 from complying with the communication policies while communicating via direct mode communication on the mutually supported secondary communication channels (e.g. based on the maximum transmit power), the BTS 104 may respond to the direct mode communication request 150 with an acknowledgement that indicates to the communication device 112 that direct mode communication among the communication devices 112-118 is not presently available. If, however, the policies do not preclude the communication devices 112-118 from transmitting at the necessary power levels in at least one mutually supported secondary communication channel, the BTS 104 can recognize such circumstances.

In some instances, for example when a communication device 118 is remotely located with respect to the communication devices 112-116, the transmit power required for the communication device 118 to participate in direct mode communication with the communication device 112-116 may exceed the communication policies identified by the geo-location database 158, while the respective transmit powers required for communication devices 112-116 to participate in direct mode communication may not. For example, based on the present location of the communication device 118, the maximum allowable transmit power that may be used by the communication device 112 may be limited due to close proximity to a licensed user, or the transmit power necessary to suitably communicate with the communication devices 112-116 may exceed maximum transmit power limitations for the secondary channel. In such circumstances, the BTS 104 may identify the communication device 118 as to be excluded from the direct mode communication session.

If any secondary communication channels are identified as being available based on the communication policies of the identified secondary communication channels, the BTS 104 can select at least one of the secondary communication channels to assign to the communication devices 112-118 to be used for direct mode communication. Such secondary communication channel(s) can be selected in any suitable manner.

For example, if it is determined that the maximum transmit power that is required for direct mode communication among the communication devices 112-118 is 1 W, the BTS 104 can select a secondary communication channel that will allow for 1 W of transmit power, even though other secondary communication channels may allow for a greater amount of transmit power. Thus, secondary communication channels that may allow for more than 1 W of transmit power can be reserved for other uses. In other arrangements, the secondary communication channel that is selected can be a secondary communication channel that allows for the greatest amount of transmit power, a secondary communication channel least used by other communication devices, and so on.

The BTS 104 can also request the participating communication devices 112-118 to sense the identified secondary channels and report the sensing results back to the BTS 104 in order to detect any local incumbent in the vicinity of the communication devices 112-118, and determine the local quality (e.g., SNR or link margin) of the available secondary channels. This can increase incumbent protection and may allow the BTS 104 to select a suitable secondary channel capable of providing the highest link margin and quality of service. It should be noted that a secondary channel assignment also may include an acceptable time of use of the channel, at any level of precision or granularity that is desired. For example, in communications systems with a time reference, particular time slots may be allocated among different devices using direct mode communications.

Once a secondary channel has been selected, the BTS 104 then can communicate to the communication device 112 a secondary communication channel assignment 160 indicating the selected secondary communication channel that may be used by the communication devices 112-118 for direct mode communication. The secondary communication channel assignment 160 also can indicate to the communication device 112 any communication channel policies applicable to the second communication channel, such as those previously described. The secondary communication channel assignment 160 also can identify which communication devices 114-118 are available for direct mode communication on the assigned secondary channel, and any other information that may be pertinent to the communication device 112 for determining whether the secondary communication assignment is suitable for the requested direct mode communication.

The communication device 112 can process the secondary communication channel assignment 160 and determine whether the secondary communication channel assignment is suitable for the requested direct mode communication. For example, the communication device 112 can determine whether any of the communication devices 114-118 which are indicated as not being available for direct mode communication are necessary for participation in the direct mode communication session seeking to be established.

If the secondary communication channel assignment is suitable, then the communication device 112 can communicate an acknowledgement to the BTS 104 indicating that the secondary communication channel assignment is accepted. If the secondary communication channel assignment is not suitable, then the communication device 112 can communicate an acknowledgement to the BTS 104 indicating that the secondary communication channel assignment is not accepted and, optionally, requesting another secondary communication channel assignment.

If the secondary communication channel assignment is not accepted by the communication device 112, the BTS 104 can determine whether another secondary communication channel is available for the requested direct mode communication. If another secondary communication channel is available for the requested direct mode communication, then the BTS 104 can communicate another communication channel assignment to the communication device 112 assigning the other secondary communication channel to be used for direct mode communication and any applicable communication policies. The process can repeat until there are no further secondary communication channels available. If no further secondary communication channels are available, the BTS 104 can communicate a message to the communication device 112 indicating such.

If a secondary communication channel assignment 160 is determined to be suitable to the communication device 112, in response to receiving an acknowledgement from the communication device 112 accepting the communication channel assignment, the BTS 104 can communicate a direct mode communication request 162 to the communication devices 112-118 indicating that direct mode communication is requested. The direct mode communication request 162 need not be communicated to communication devices 112-118 which are to be excluded from the direct mode communication session, however. The direct mode communication request 162 can indicate the communication device 112 requesting the secondary communication channel assignment, and other communication devices 114-118 asked to participate in the direct mode communication session. The direct mode communication request 162 also can indicate the secondary channel assigned for direct mode communication, the maximum allowed transmit power on the secondary communication channel, a transmit mask for the secondary communication channel and/or any other information pertinent for the communication devices 112-118 to suitably establish and participate in the direct mode communication session without interfering with communications of incumbent users.

If a communication device 118 is currently being services by another BTS 106 and within range of other participating communication devices 112-116, then the BTS 104 can communicate the secondary communication channel request to the communication device 118 via the BTS 106, or any other suitable communication means. Moreover, if the communication device 118 is communicatively linked to the BTS 106 via the repeater 110, the BTS 106 can forward the direct mode communication request 162 to the communication device 118 via the repeater 110.

In some instances, certain communication devices 112-118 may be out of range to communicate with any of the BTSs 104-108 or the repeater 110. In such cases, if one or more other communication devices 112-118 are configured to operate as repeaters for other communication devices, the communication devices can relay messages (e.g. direct mode communication requests 150, secondary communication channel assignments 160, direct mode communication requests 162, acknowledgements 164 and direct mode communication messages) between the BTSs 104-108 and the out of range communication devices. For example, the communication device 112 can relay direct mode communication requests 162 and acknowledgements 164 between the communication device 114 and the BTS 104. Similarly, the communication device 116 can relay direct mode communication requests 150, secondary communication channel assignments 160 and acknowledgements 154 between the communication device 112 and the BTS 104.

To implement relaying messages by the communication devices 112-118, e a c h of the communication devices 112-118 can be configured repeat (e.g. re-transmit) communication messages, such as those previously describe, or specific communications devices 112-118 can be tasked with repeating the messages. For example, a communication device 116 that is closest to the communication device 118 can be tasked with relaying messages for the communication device 118. Communication devices 112-118 that do not acknowledge the direct mode communication requests 162 are prime candidates for receiving localized re-transmission of messages via nearby communication devices 112-118. In this regard, the BTS 104 generally will have knowledge of which communication devices 112-118 that have properly responded to the direct mode communication requests 162, and those that have not, for example the communication device 118. In addition, the BTS 104 also can be cognizant of the respective locations of the communication devices 112-118. Accordingly, the BTS can selectively designate a particular communication device 116 to relay messages to and from the communication device 118.

In response to receiving the direct mode communication request 162, the communication devices 112-118 that are available to communication using direct mode communication without exceeding the policies identified by the geo-location database 158 can begin communicating among one another using direct mode communication. The communication devices 114-118 (and optionally the communication device 112) also may respond to the direct mode communication request 162 with respective acknowledgements 164 accepting or denying the direct mode communication request 162.

In an arrangement in which one or more other communication devices 112-118 are configured to operate as repeaters for other communication devices, the communication devices also can relay direct mode communication signals for other communication devices. For example, if the communication device 114 is outside the range of communication for communicating with the communication device 116 and/or the communication device 118, the communication device 112 can relay direct mode communication signals between the communication device 114 and the communication device 116 and/or the communication device 118. Similarly, if the communication device 112 is outside the range of communication for communicating directly with the communication device 116 and/or the communication device 118 the communication device 114 can relay direct mode communication signals between the communication device 112 and the communication device 116 and/or the communication device 118.

When direct mode communication among the communication devices 112-118 participating in the direct mode communication session is no longer required, the direct mode communication session can be terminated and the secondary channel resources allocated to the direct mode communication session can be released. When the secondary channel resources are released, the BTS 104 can communicate a channel release notification 166 to the available channel database 156 that maintains the list of available channels.

The channel release notification 166 can be triggered in any suitable manner. For example, the channel release notification can be triggered by the communication device 112 in response to a user input or a timeout triggered when no direct mode communications are received on the allocated secondary communication channel for a particular period. In this arrangement, the communication device can communicate a channel release notification to the BTS 104. Similarly, in an arrangement in which the BTS 104 monitors use of the assigned secondary communication channel, the BTS 104 can trigger the channel release notification 166 in response to detecting that no direct mode communications have taken place on the allocated secondary communication channel for a particular period of time.

It should be noted that a secondary communication channel that is assigned to the communication devices 112-118 for direct mode communication also may be used opportunistically used on a secondary basis by other communication devices so long as such use does not interfere with the direct mode communication session established for the communication devices 112-118. In this regard, the communication devices 120-128 also can access the same secondary communication channel assigned to the communication devices 112-118 on a secondary basis.

For example, in response to receiving from the communication device 126 a direct mode communication request 168 that identifies a communication device 128 for which direct mode communication with the communication device 126 is desired, the BTS 104, BTS 106 and/or BTS 108 can access the available channel database 156 and the geo-location database 158, as previously described, to establish direct mode communications between the communication devices 126, 128. Direct mode communications between the communication devices 126, 128 can be established in a manner which will not interfere with the direct mode communication session established among the communication devices 112-118, nor interfere with communications of primary or incumbent users.

For instance, based on the geographic locations of the communication devices 120-128 with respect to the communication devices 112-118, the BTS 104, BTS 106 and/or BTS 108 can determine whether transmissions by the communication devices 120-128 on the secondary communication channel will interfere with the direct mode communications established among the communication devices 112-118 prior to assigning the secondary channel for use by the communication devices 120-128. If such usage will not interfere with the direct mode communications of the communication devices 112-118, the same secondary channel also can be assigned to the communication devices 120-128. Thus, the same secondary channel can be allocated at different locations for direct mode communication.

In some circumstances, other communication devices 126, 128 not initially participating in the direct mode communication session established among the communication devices 112-118 may desire to participate in the direct mode communication session. For example, if the communication devices 126, 128 detect direct mode communications of the communication devices 112-118, or one or more users of the communication devices 126-128 communicate a direct mode communication request 168 to the BTS 104 (e.g. via their serving BTS 108), requesting for the communication devices 126-128 to participate in the direct mode communication session. Hence, users across more than one base station are able to communicate in direct mode.

In response, a secondary communication channel assignments 170 can be communicated to the communication device 126 and a direct mode channel request 172 can be communicated to the communication device 126 and/or the communication device 128. The direct mode channel request 172 can indicate the secondary channel assigned for direct mode communication, the maximum allowed transmit power on the secondary communication channel, a transmit mask for the secondary communication channel and/or any other information pertinent for the communication devices 126-128 to suitably establish and participate in the direct mode communication session without interfering with communications of incumbent users.

In another arrangement, the BTS 108 can relay communications between the communication devices 126, 128 and the communication devices 112-118, for instance via the BTS 104, the BTS 106 and/or the repeater 110. In this regard, although the communication devices 126, 128 may communicate on the same secondary channel that is assigned to the communication devices 112-118, this need not be the case. For instance, if the communication devices 126, 128 are not communicating directly with the communication devices 112-118, but instead are communicating with the communication devices 112-118 via the BTS 108, the BTS 104, the BTS 106 and/or the repeater 110, the communication devices 126, 128 can be assigned another secondary channel on which to communicate. This arrangement can be beneficial if the secondary channel used for direct mode communications among the communication devices 112-118 is not available to the communication devices 126, 128 due to the present location of the communication devices 126, 128, for instance if the communication devices 126, 128 are located proximate to a primary or incumbent user communicating in the same frequency spectrum being used by the communication devices 112-118 for direct mode communication.

Figure 2:
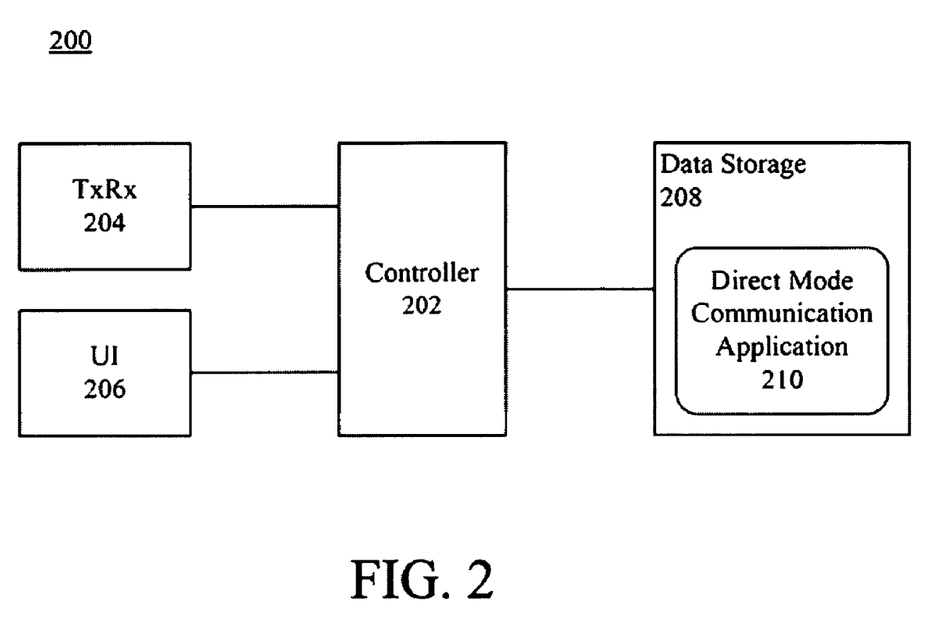
FIG. 2 depicts a block diagram of a wireless communication device that is useful for understanding the present invention.

FIG. 2 depicts a block diagram of a wireless communication device (hereinafter "communication device") 200 that is useful for understanding the present invention. The communication device 200 can include a controller 202, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The communication device 200 also can include a transceiver 204. The transceiver 204 can modulate and demodulate signals to convert signals from one form to another, and can transmit and/or receive such signals over one or more various wireless communication networks. In illustration, the transceiver 204 can be configured to communicate data via direct mode communication, for example using Wi-Fi, WiMAX, LTE, or any other suitable protocol, such as CDMA or TDMA-based communications systems.

The transceiver 204 also can be configured to communicate via one or more additional communication protocols. Examples of such communication protocols include, but are not limited to, IEEE 802 wireless communications, for instance, 802.11 and 802.16 (WiMax), WPA, or WPA2. In another examples, the transceiver 304 can communicate data via TDMA, CDMA, WCDMA, GSM, GPRS, UTMS, 3G, 4G, EUTRAN, UMB, OFDM, LTE, etc. Further, the transceiver 204 also can be configured to communicate over a wireless communication link using any of a myriad of other communications protocols, for example, TCP/IP.

The communication device 200 further can include a user interface 206. The user interface 206 also can comprise one or more tactile input devices, for example one or more buttons, keys, soft keys, sensors, or any other devices suitable for receiving a tactile user input and communicating the tactile user input to the controller 202. The user interface 206 also can include a display. In one arrangement, the display can comprise a touch screen that can receive tactile and/or stylus inputs and communicate such inputs to the controller 202. The user interface 206 further can include an audio processor, an input audio transducer, an output audio transducer, as well as any other devices for receiving user inputs and communicating information to a user.

The communication device 200 further can include a data storage 208 communicatively linked to the controller 202. The data storage 208 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 208 can be integrated into the controller 202, though this need not be the case.

A direct mode communication application 210 can be stored on the data storage 208 or otherwise made accessible to the controller 202. The direct mode communication application 210 can be executed by the controller 202 to implement the methods and processes described herein that are performed by the communication device 200. For example, the controller 202 can execute the direct mode communication application 210 to generate channel assignment requests, process channel assignments, implement direct mode communication, relay messages communicated to and from other communication devices, etc.

Figure 3:
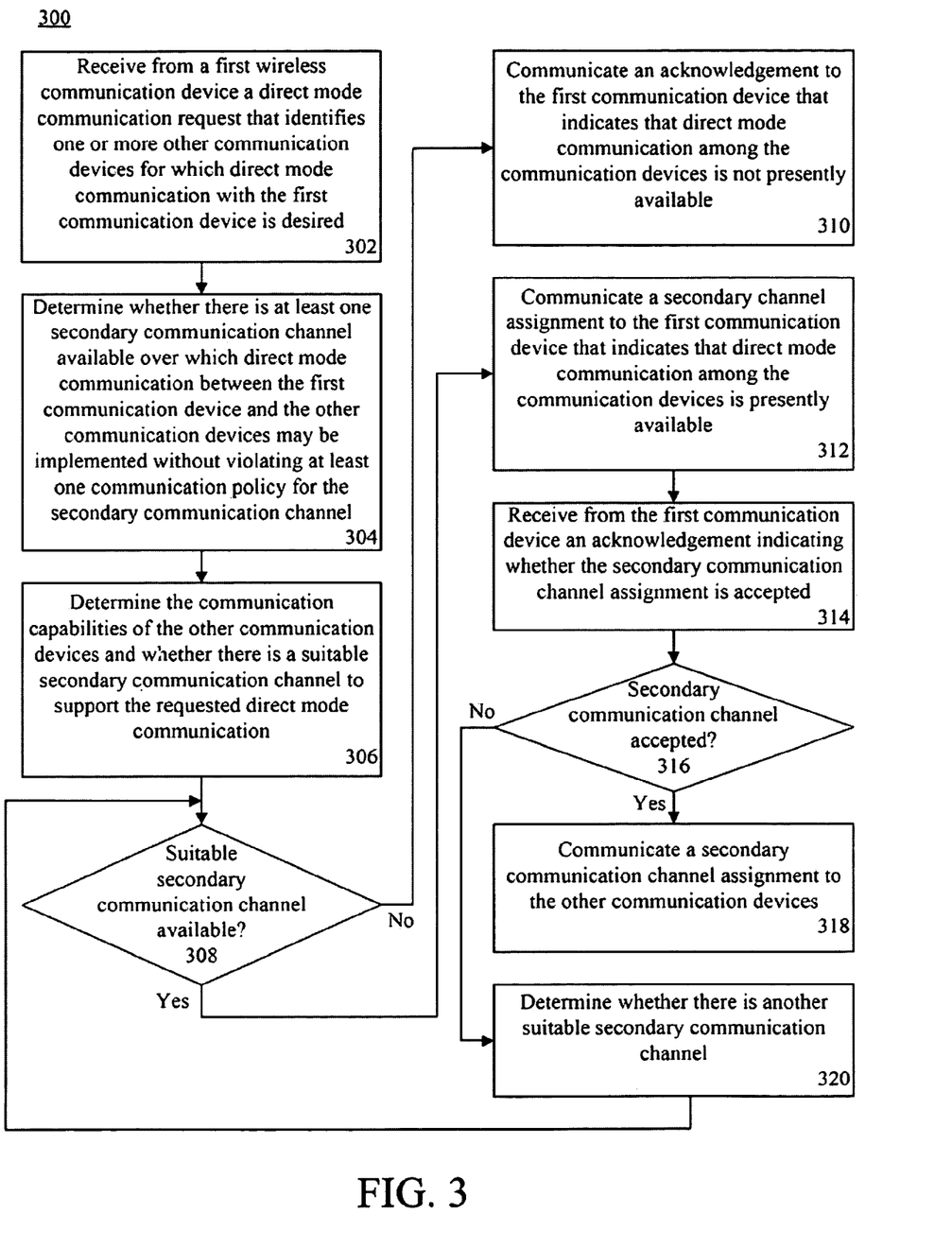
FIG. 3 is a flowchart presenting a method of allocating secondary communication channels in a dedicated frequency spectrum on a secondary basis, which is useful for understanding the present invention.

FIG. 3 is a flowchart presenting a method 300 of allocating secondary communication channels in a dedicated frequency spectrum on a secondary basis, which is useful for understanding the present invention. At step 302, a direct mode communication request can be retrieved from a first communication device. The direct mode communication request can identify one or more other communication devices for which direct mode communication with the first communication device is desired.

At step 304, a determination can be made as to whether there is at least one secondary communication channel available over which direct mode communication between the first communication device and the other communication devices may be implemented without violating at least one communication policy for the secondary communication channel. For example, a determination can be made whether the transmit power required for at least one of the communication device to participate in the direct mode communication will violate the communication policy for the secondary communication channel.

At step 306, the communication capabilities of the other communication devices can be determined. For instance, a determination can be made as to the maximum transmit power of the other communication devices which are requested to participate in the direct mode communication session. A determination can be made as to the channel parameters supported by the other communication devices, whether the other communication devices support direct mode communication, and/or any other characteristics that may be pertinent to determine whether they may participate in the requested direct mode communication session.

A determination also can be made as to whether there is a suitable secondary channel available to support the requested direct mode communication. This determination can be based upon the communication capabilities of the other communication devices and data received from the geo-location database and/or the available channels database.

Referring to decision box 308, if a secondary communication channel is not available to support the requested direct mode communication, at step 310 an acknowledgement can be communicated to the first communication device that indicates that requested direct mode communication among the communication devices is not presently available.

If a secondary communication channel is not available to support the requested direct mode communication, at step 312, a secondary channel assignment can be communicated to the first communication device that indicates that requested direct mode communication among the communication devices is available. The secondary channel assignment can indicate certain ones of the other communication devices also can indicate to the communication device 112 any communication channel policies applicable to the second communication channel, such as those previously described. The secondary channel assignment also can identify which communication devices are available for direct mode communication on the assigned secondary channel, and any other information that may be pertinent to the first communication device for determining whether the secondary communication assignment is suitable for the requested direct mode communication.

At step 314, an acknowledgement can be received from the first communication device indicating whether the secondary communication channel assignment is accepted. Referring to decision box 316, if the assignment of the secondary communication channel is accepted, at step 318 a secondary communication channel assignment can be communicated to the other communication devices. If not, at step 318, a determination can be made whether another suitable secondary communication channel is available and the process can continue to decision box 308.

Figure 4:
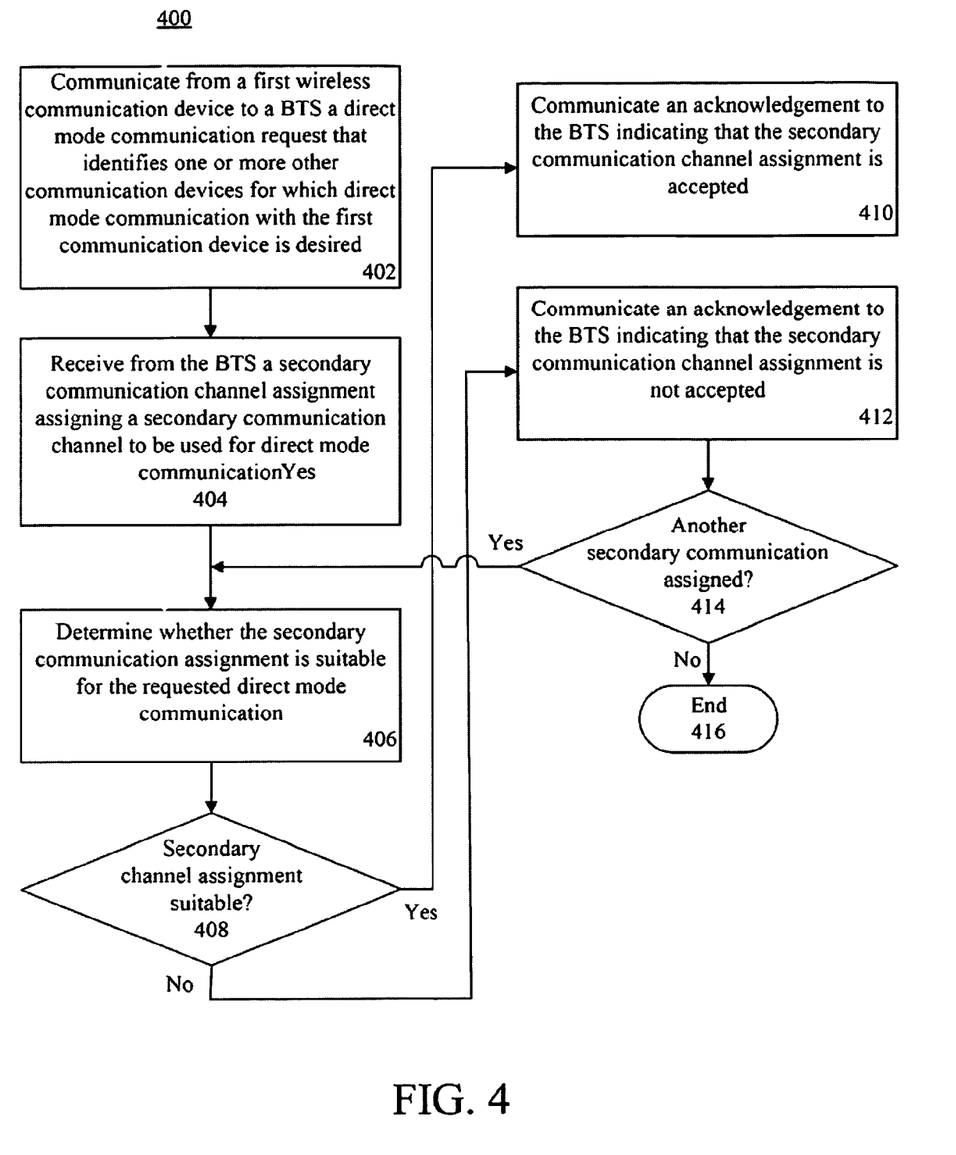
FIG. 4 is a flowchart presenting a method of requesting allocation of secondary channels in a dedicated frequency spectrum on a secondary basis, which is useful for understanding the present invention.

FIG. 4 is a flowchart presenting a method 400 of requesting allocation of secondary communication channels in a dedicated frequency spectrum on a secondary basis, which is useful for understanding the present invention. At step 402, a direct mode communication request can be communicated from a first communication device to a BTS. The direct mode communication request can identify one or more other communication devices for which direct mode communication with the first communication device is desired.

At step 404, a secondary communication channel assignment can be received from the BTS. The secondary channel assignment can be an assignment of a secondary communication channel to be used for direct mode communication. At step 406, a determination can be made as to whether the secondary communication assignment is suitable for the requested direct mode communication. Referring to decision box 408, if the secondary channel assignment is suitable, an acknowledgement can be communicated to the BTS indicating that the secondary communication channel assignment is accepted at step 410.

If, however, the secondary channel assignment is not suitable, an acknowledgement can be communicated to the BTS indicating that the secondary channel assignment is not accepted at step 412. Referring to decision box 414, if the secondary channel assignment is received, the process returns to step 406. If not, the process can end at step 416.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of implementing direct mode communication, comprising:

receiving from a first wireless communication device a direct mode communication request that identifies at least a second wireless communication device for which direct mode communication with the first wireless communication device is desired;

determining whether there is at least one secondary communication channel available over which direct mode communication between the first wireless communication device and the second wireless communication device may be implemented without violating at least one communication policy for the secondary communication channel;

when there is at least one secondary communication channel available over which direct mode communication between the first wireless communication device and the second wireless communication device may be established without violating at least one communication policy for the secondary communication channel, communicating a secondary communication channel assignment to at least the first wireless communication device assigning the secondary communication channel to be used for direct mode communication; and receiving, at a base station, from the first wireless communication device a first acknowledgement indicating whether the assigned secondary communication channel is accepted; and if the assigned secondary communication channel is not accepted:

determining whether another secondary communication channel is available for the requested direct mode communication; and if another secondary communication channel is available for the requested direct mode communication, communicating another communication channel assignment to the first wireless communication device assigning the another secondary communication channel to be used for direct mode communication.

2. A method of implementing direct mode communication, comprising:

receiving from a first wireless communication device a direct mode communication request that identifies at least a second wireless communication device for which direct mode communication with the first wireless communication device is desired;

determining whether there is at least one secondary communication channel available over which direct mode communication between the first wireless communication device and the second wireless communication device may be implemented without violating at least one communication policy for the secondary communication channel;

when there is at least one secondary communication channel available over which direct mode communication between the first wireless communication device and the second wireless communication device may be established without violating at least one communication policy for the secondary communication channel, communicating a secondary communication channel assignment to at least the first wireless communication device assigning the secondary communication channel to be used for direct mode communication;

wherein determining whether there is at least one secondary communication channel available over which direct mode communication between the first wireless communication device and the second wireless communication device may be implemented by:

determining whether a transmit power required for the second wireless communication device to participate in the direct mode communication will violate the communication policy for the secondary communication channel; and wherein the direct mode communication request further identifies at least a third wireless communication device for which direct mode communication with at least the first wireless communication device is desired; and determining whether there is at least one secondary communication channel available over which direct mode communication between the first wireless communication device and the second wireless communication device may be implemented further comprises:

determining whether the transmit power required for the third wireless communication device to participate in the direct mode communication will violate the communication policy for the secondary communication channel; and when the transmit power required for the third communication to participate in the direct mode communication will violate the communication policy for the secondary communication channel, in the secondary communication channel assignment communicated to the first wireless communication device, identifying the third wireless communication device as being unavailable for the direct mode communication.

3. A method of implementing direct mode communication, comprising:

receiving from a first wireless communication device a direct mode communication request that identifies at least a second wireless communication device for which direct mode communication with the first wireless communication device is desired;

determining whether there is at least one secondary communication channel available over which direct mode communication between the first wireless communication device and the second wireless communication device may be implemented without violating at least one communication policy for the secondary communication channel;

when there is at least one secondary communication channel available over which direct mode communication between the first wireless communication device and the second wireless communication device may be established without violating at least one communication policy for the secondary communication channel, communicating a secondary communication channel assignment to at least the first wireless communication device assigning the secondary communication channel to be used for direct mode communication; and receiving, at a base station, from the first wireless communication device a first acknowledgement indicating whether the assigned secondary communication channel is accepted; and if the assigned secondary communication channel is not accepted:

determining whether another secondary communication channel is available for the requested direct mode communication; and if another secondary communication channel is available for the requested direct mode communication, communicating another communication channel assignment to the first wireless communication device assigning the another secondary communication channel to be used for direct mode communication.

* * * * *